United States Patent [19]

Jacob

[11] Patent Number: 5,577,620
[45] Date of Patent: Nov. 26, 1996

[54] STORAGE RACK MADE FROM MODULAR COMPONENTS

[75] Inventor: Gary Jacob, Forest Lake, Minn.

[73] Assignee: Arista Products, Inc., Hauppauge, N.Y.

[21] Appl. No.: 365,694

[22] Filed: Dec. 29, 1994

[51] Int. Cl.[6] ................................................. A47F 7/00
[52] U.S. Cl. .............................. 211/40; 211/194; 312/9.9; 206/309; D6/407
[58] Field of Search ................................ 211/40, 41, 194; 312/9.9, 9.11; 206/309; D6/407, 465

[56] References Cited

U.S. PATENT DOCUMENTS

| | | |
|---|---|---|
| D. 319,741 | 9/1991 | Sylvester . |
| D. 331,166 | 11/1992 | Ohadi . |
| D. 342,395 | 12/1993 | Huang . |
| D. 343,533 | 1/1994 | David . |
| D. 351,512 | 10/1994 | Thielen . |
| D. 352,187 | 11/1994 | David . |
| D. 352,848 | 11/1994 | Dardashti . |
| 601,753 | 4/1898 | Kaiser . |
| 1,652,114 | 7/1925 | Gestrine . |
| 4,678,245 | 4/1986 | Fouassier . |
| 5,048,702 | 9/1991 | Maloney ................................ 211/194 |
| 5,054,626 | 10/1991 | Stempinski . |
| 5,078,278 | 1/1992 | Edmark .............................. 211/194 X |
| 5,129,525 | 7/1992 | Maynard . |
| 5,154,291 | 10/1992 | Suv .................................. 312/9.11 X |
| 5,191,983 | 3/1993 | Hardy .................................... 211/40 |
| 5,195,642 | 3/1993 | Dardashti . |
| 5,199,577 | 4/1993 | Curtis .................................... 211/40 |
| 5,219,079 | 6/1993 | Nakamura . |
| 5,344,028 | 9/1994 | Angele .................................. 211/40 |
| 5,370,243 | 12/1994 | Rosario ............................. 211/194 X |
| 5,423,434 | 6/1995 | Chen .................................... 211/40 |

FOREIGN PATENT DOCUMENTS

| | | |
|---|---|---|
| 9300261 | 9/1994 | Netherlands . |
| 244308 | 9/1946 | Switzerland . |

OTHER PUBLICATIONS

Home Decorator Collection Catalog, Sep. 15, 1992, pp. 22 & 23.

*Primary Examiner*—Robert W. Gibson, Jr.
*Attorney, Agent, or Firm*—Collard & Roe, P.C.

[57] ABSTRACT

A storage rack for storing compact disc, cassette and videotape cases in a vertical stack. The storage rack consists of a base having a tower support with a top surface set at a predetermined oblique angle. Modular components are stacked on top of the base to form a storage tower. The modular components and the corresponding storage slots are also oriented at the predetermined oblique angle. The stored cases disposed in the slots display their title at an upwardly turned angle which makes them easy to view. The base may be equipped with several tower supports to support several storage towers facing in similar or different directions.

13 Claims, 3 Drawing Sheets

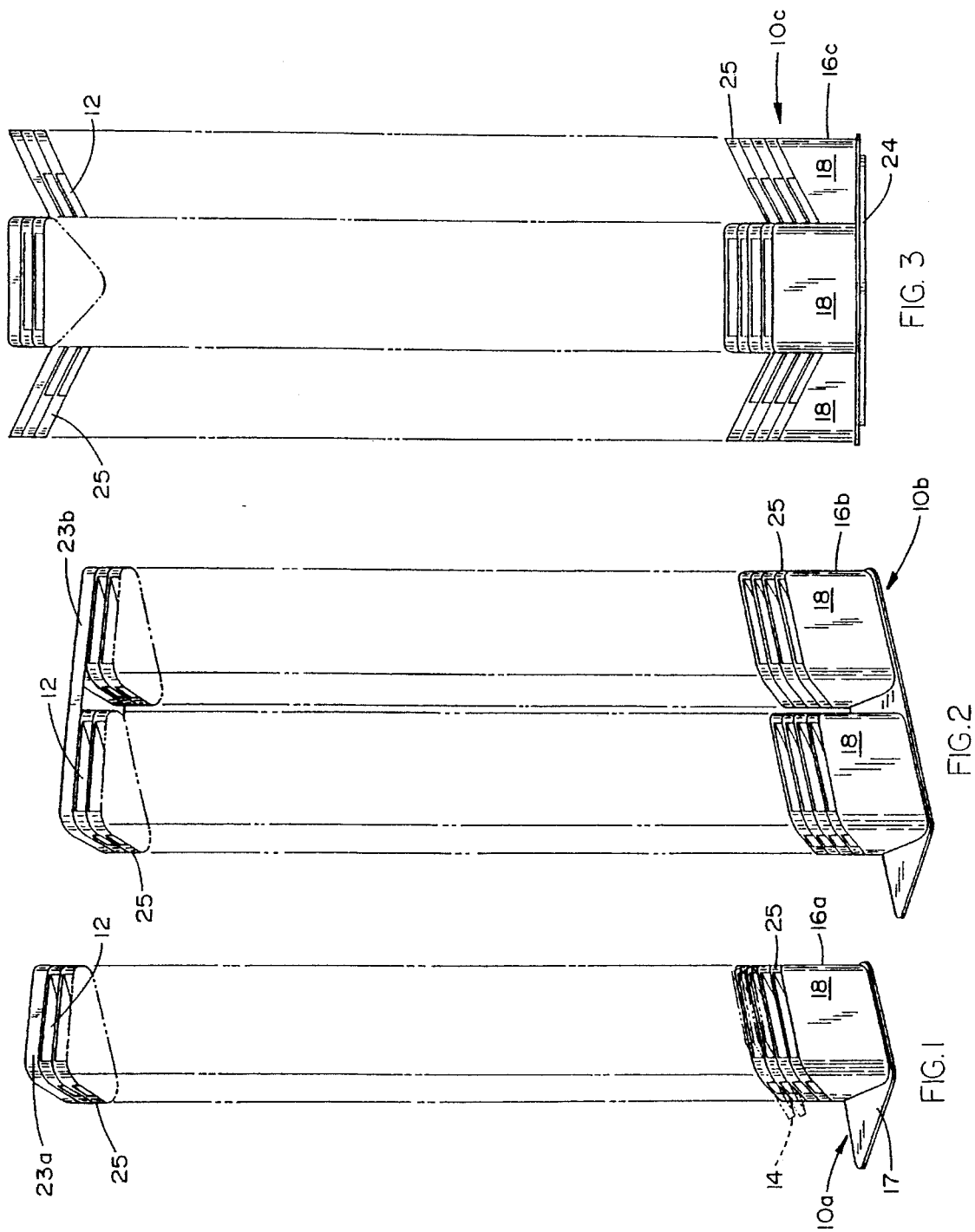

STORAGE RACK MADE FROM MODULAR COMPONENTS

BACKGROUND OF THE INVENTION

1. Field of the Invention

The invention relates to a storage rack made from modular components. More particularly, it relates to a storage rack for holding cases in a vertical stack with one side of the cases extending outwardly from the rack and angled upwardly for easy viewing.

2. The Prior Art

The prior art discloses many types of racks for displaying or storing a large variety of different items. One type of storage rack holds items horizontally in a vertical stack, as shown in U.S. Pat. No. D 331,166 to Ohadi, U.S. Pat. No. D 342,395 to Huang, U.S. Pat. No. D 351,512 to Thielen, U.S. Pat. No. D 352,848 to Dardashti and U.S. Pat. No. 5,195,642 to Dardashti. A major drawback with these types of storage racks is that it is necessary to view each item in the rack substantially at eye level in order to determine the contents. This makes it difficult to scan through the titles, particularly for items stored at the very bottom of the rack.

Certain attempts have been made to overcome these drawbacks by providing racks which would store the items at an angle or in a leaning stack. An example of these later patents are U.S. Pat. No. D 319,741 to Sylvester, U.S. Pat. No. D 343,533 to David and U.S. Pat. No. D 352,187 to David. Although the items stored in the upper part of these racks may be easier to view, the lower slots are still too close to the ground to be easily viewed. In addition, these racks are costly to manufacture, and their parts cannot be easily converted for use in racks having different configurations.

Accordingly, it would be desirable to provide a storage rack inexpensively constructed from modular components which efficiently store items in a vertical stack with the titles being easily readable and spaced from the floor.

SUMMARY OF THE INVENTION

It is, therefore, an object of the present invention to provide a storage rack which efficiently stores items in a vertical stack in a manner where an item can be easily located and removed from the rack.

It is a further object of the present invention to provide a storage rack which is simply and inexpensively constructed from modular components.

These and other related objects are achieved according to the invention by a device for storing compact disc cases, audio/visual cassette cases, computer storage media cases or similar cases in a vertical stack with one side of the cases extending outwardly from the device and angled upwardly for easy viewing. The device includes a base having a raised front portion and a top surface set at an oblique angle. A plurality of modular components are stacked on top of the base. Each modular component has a central plate with a periphery disposed parallel to the top surface and vertically-extending support means for engaging an adjacent modular component. A storage slot with an open receiving end is formed between each adjacent pair of central plates for storing the cases at said oblique angle. The support means includes legs formed at the periphery bordering the storage slot. The legs and portions of the plate periphery remote from the storage slot form a continuous column along a height of the stacked modular components.

The central plate is triangular with three corners, three sides and a leg formed at each corner. Each of the legs has a first interior surface facing the storage slot and a shaped or rounded exterior surface. The three corners comprise two front corners and a rear corner. The three sides comprise two rear sides extending between the front corners and the rear corner and a front side extending between the front corners. The two front corners and the front side are disposed above the raised front portion of the base. Two of the flat interior surfaces at the two front corners face each other across the front side adjacent the open receiving end of the storage slot. The flat interior surface at the rear corner is positioned opposite the open receiving end. The two rear sides taper toward each other as they extend from the two front corners back toward the rear corners so that the rear corners of the case extend outwardly from the device.

The case contacts the leg at the rear corner when fully inserted with the opposite side of the case remaining free outside the open receiving end of the storage slot for easy viewing and for removing the case from the device. The legs are connected to the plate of an adjacent modular component. The modular components are integrally formed with the legs integrally molded to the central plate. The central plate includes a first side having legs extending outwardly therefrom and a second opposite side including connection means for connecting to the legs of an adjacent modular component. The connection means consists of a recess at each corner, the legs include pegs positioned and dimensioned to fit within the recess on an adjacent modular component. The length of the legs determines the height of the storage slot and is variable to provide storage slots for differently shaped cases. In an alternate embodiment, the base includes two raised front portions and two top surfaces set at a predetermined oblique angle for supporting two stacks of modular components. In a further embodiment, the base supports four stacks of modular components with each stack being oriented 90° from the two adjacent stacks.

BRIEF DESCRIPTION OF THE DRAWINGS

Other objects and features of the present invention will become apparent from the following detailed description in connection with the accompanying drawings considered which discloses several embodiments of the present invention. It should be understood, however, that the drawings are designed for the purpose of illustration only and not as a definition of the limits of the invention.

In the drawings, wherein similar reference characters denote similar elements throughout the several views:

FIG. 1 is a perspective view of a storage rack according to the invention with a single tower;

FIG. 2 is a perspective view of a storage rack according to the invention with two towers;

FIG. 3 is a front side elevational view of a storage rack according to the invention with four towers;

DETAILED DESCRIPTION OF THE PREFERRED EMBODIMENTS

Figure 4:
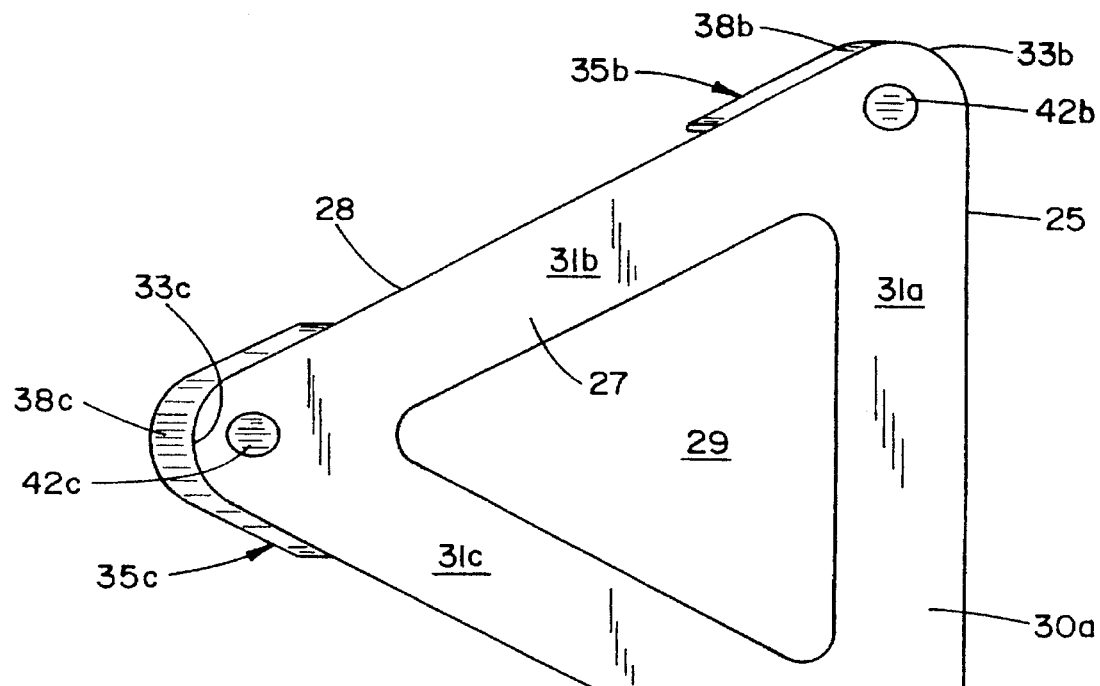
FIG. 4 is a top plan view of a modular component.

Referring now in detail to the drawings, and in particular, FIG. 1, there is shown a storage rack 10a having a plurality of slots 12 along its height for storing compact disc cases 14.

Storage rack 10a includes a base 16a consisting of a plate 17 and a single tower support 18. A plurality of modular components 25 are stacked vertically on top of tower support 18 to form slots 12 therebetween. A cap 23a is placed on the uppermost modular component to provide a finished look to the tower. The top surface of tower support 18 is set at a particular oblique angle. Modular components 25 are set on top of tower support 18, parallel to its top surface, at the same oblique angle. Slots 12 are also oriented at the same oblique angle. The stored CD cases 14 are also oriented at the same oblique angle. As a result, the side of the CD cases which remain outside of slot 12, i.e., the spines containing the titles, are angled upwardly. As a result, even when storage rack 10a is placed on the floor, the CD titles are visible and readable without having to lower one's eyes.

In addition to defining the predetermined oblique angle, tower support 18 also maintains the lower slots at a minimum height off the floor. Frequently, the lowest slots of a storage rack are either not used or not used to their full capacity because they are inconveniently located too close to the floor. The titles stored in those lower compartments are not readily visible, and one would have to kneel down to remove them. The angled slots shown in FIG. 1 allow all titles to be visible from a standing position. Since a portion of the case remains outside of the slot, even the lowest case can be easily identified and removed from the rack due to its angled orientation and spacing from the floor.

Referring now to FIG. 2, there is shown a second embodiment of a storage rack 10b having a base 16b with two tower supports 18. Modular components 25 are then stacked on top of each tower support 18. A cap 23b covers both towers. Although both towers are shown with their slots opening in the same direction, the towers can be oriented so that they face in opposite directions, or directed 90° from each other. Modular components 25 are connected to each other and tower support 18 by a suitable adhesive, for example, epoxy cement or glue.

FIG. 3 shows a base 16c where three or four tower supports 18 may be placed. A plurality of modular components 25 are stacked upon each tower support 18. With the receiving end of slots 12 facing in different directions, it may be necessary or convenient to rotate storage rack 10c. A rotating base 24 is mounted on the bottom of storage rack 10c, so that base 16c can be rotated with respect to base 24. The features of the visible titles on the lowest cases and their spacing from the floor, as discussed above, are even more significant for the three or four tower design. Since three or four times the number of cases are positioned at the bottom of a stack, visibility and accessibility are key.

Figure 5:
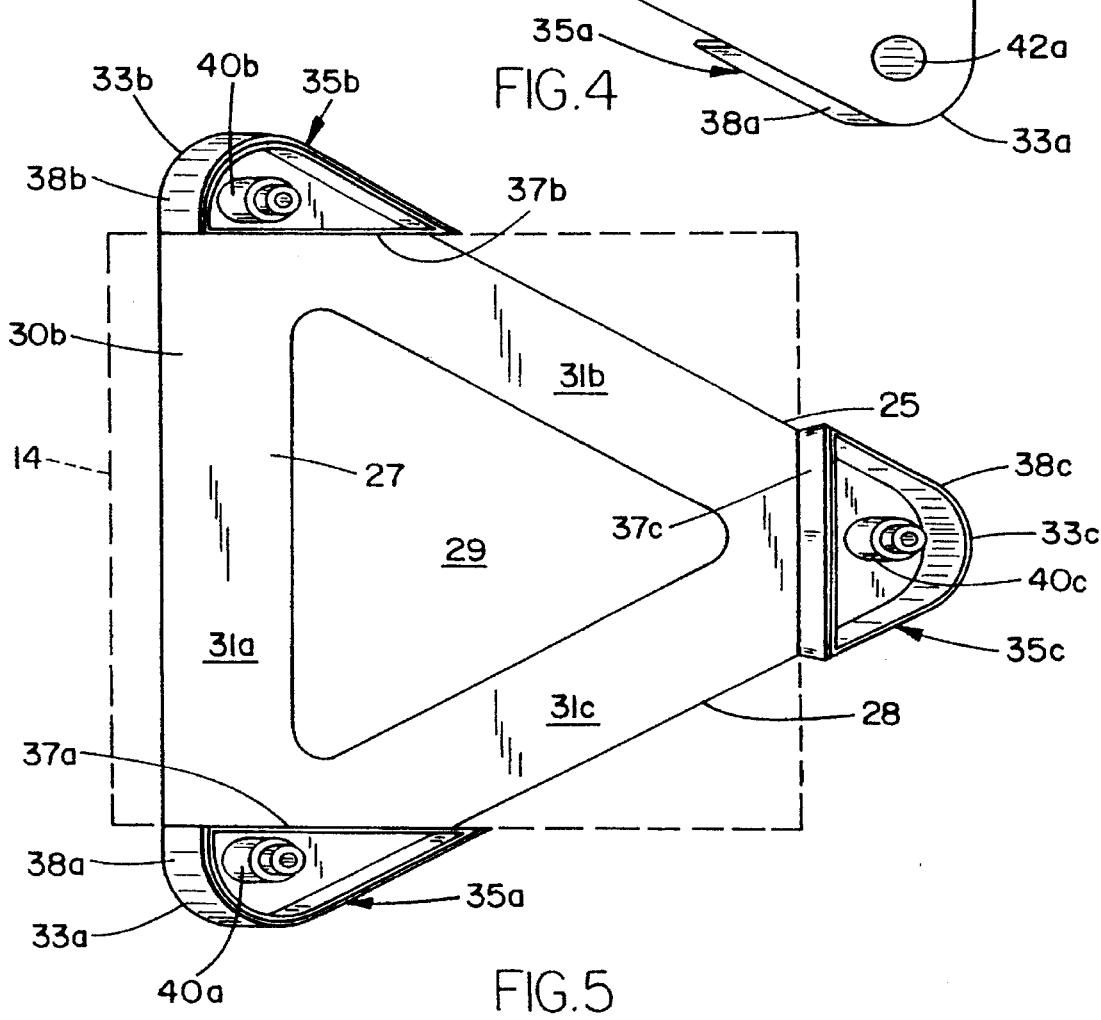
FIG. 5 is a bottom plan view of the modular component.

FIGS. 4 and 5 show a single modular component 25 having a central triangular plate 27, with a periphery 28, and an aperture 29. Modular component 25 consists of three sides 31a, 31b and 31c and three corners 33a, 33b and 33c. Hollow legs 35a, 35b and 35c are located at corners 33a, 33b and 33c, respectively. Each of the legs includes a flat surface 37a, 37b and 37c facing slot 12 and a contoured, shaped, or rounded surface 38a, 38b and 38c facing away from slot 12. Slot 12 is defined by lower surface 30b, flat surfaces 37a, 37b, 37c and upper surface 30a of the adjacent lower modular component. Each of the legs includes, within its hollow, a peg 40a, 40b and 40c, respectively. Upper surface 30a has a set of correspondingly positioned and sized bores 42a, 42b and 42c for receiving the pegs from the adjacent upper modular component 25. Caps 23a and 23b are equipped with pegs to connect to the top surface of the uppermost modular component.

An outline of a CD case, audio/video cassette case, computer storage media case 14 or the like is shown in FIG. 5 to illustrate its relationship with modular component 25. Flat surfaces 37a and 37b, which face each other across side 31a, form partial sides for slot 12. Since flat surfaces 37a and 37b originate at the opening of slot 12 and extend more than one-third of the depth of the slot, they serve as a guide for the CD case. The lateral support provided by flat surfaces 37a and 37b maintains CD case 14 properly aligned within the slot even though the rear edges of the case extend out beyond modular component 25 once they clear flat surfaces 37a and 37b. Case 14 is inserted into the slot until it contacts flat surface 37c.

The plates 27 bordering each slot also provide vertical stability for the CD case as it is inserted and removed from the slot. Although plates 27 are shown in a triangular configuration with a centrally-located triangular aperture, other configurations are possible. For example, plate 27 may be continuous without an aperture therein, however, the aperture serves to save material and reduce the cost of construction and also reduces the overall weight of the fully-assembled unit. Alternatively, a T-shape may be employed consisting of side 31a and a second member bisecting side 31a and extending back to leg 35c. Since the stored cases extend beyond sides 31a, 31b, and 31c, two adjacent cases substantially cover the sides of the plate in between them. Since the corners 33a, 33b and 33c are sandwiched between adjacent legs, the entire plate is virtually invisible when filled with cases. In addition, the thin plates provide a high density for the stacked cases.

Although legs 35a, 35b and 35c are shown as being hollow, alternate constructions are possible. For example, the legs may be solidly filled around the pegs. However, the hollow legs use less material and reduce the cost and weight of the fully-assembled unit. Furthermore, even though legs 35a, 35b and 35c are shown extending vertically down from lower surface 30b of modular component 25, other constructional embodiments may be employed to achieve similar results. For example, the legs 35a, 35b or 35c or the pegs 40a, 40b or 40c, or both, may extend from upper surface 30a of modular component 25. In the event that legs 35a, 35b and 35c extend from upper surface 30a, slot 12 would be defined by upper surface 30a, flat surfaces 37a, 37b and 37c of the legs and lower surface 30b of the adjacent upper modular component.

Figure 6:
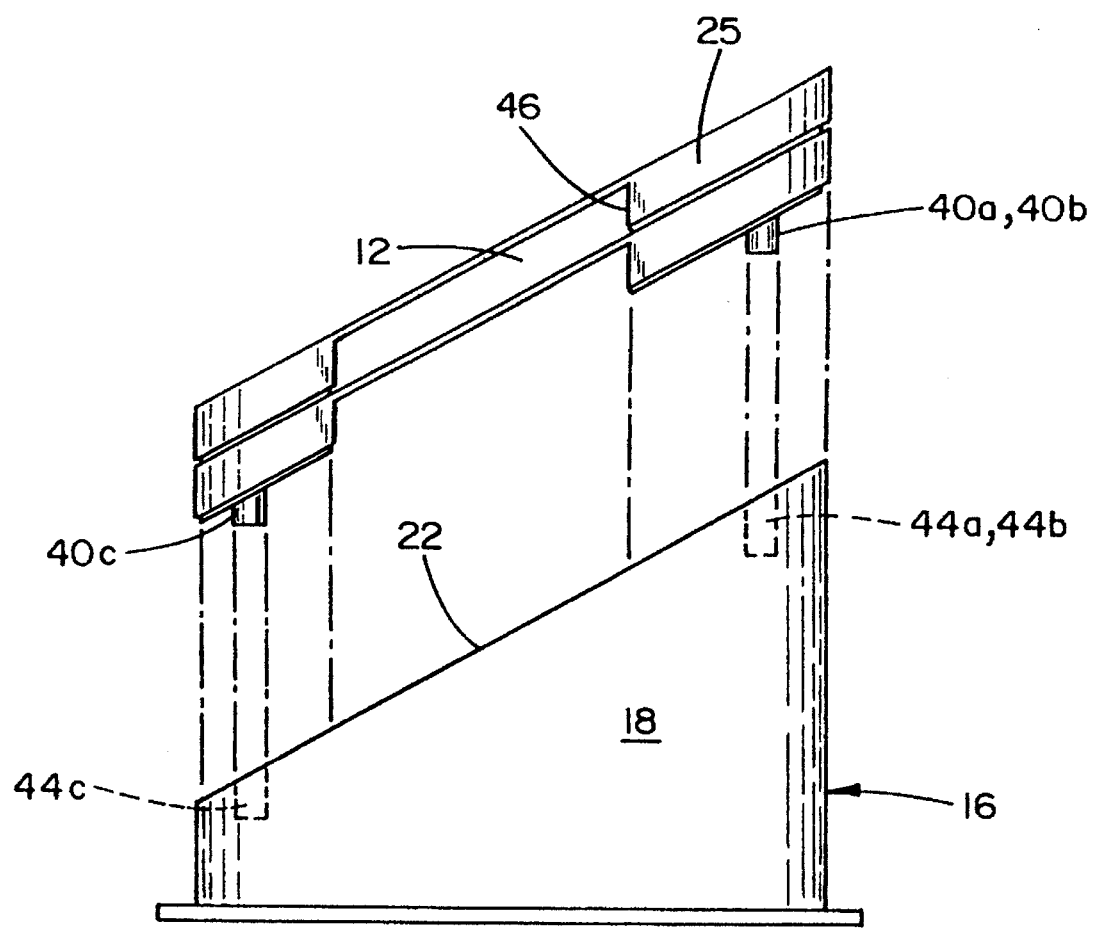
FIG. 6 is a left side elevational view showing two of the modular components spaced above the base.

Referring now to FIG. 6, modular components 25 are shown oriented for attachment to tower support 18 of base 16. Tower support 18 includes a top surface 22 set at an oblique angle. This oblique angle determines the angle at which modular components 25 are set, the angle at which slot 12 is set and the resulting angle for the stored cases. Set within top surface 22 are bores 44a, 44b and 44c. The position and size of bores 44a, 44b and 44c are similar to those of 42a, 42b and 42c shown in upper surface 30a of modular component 25 in FIG. 4. The lowest modular component 25 connects onto top surface 22 with its pegs 40a, 40b and 40c fitting within bores 44a, 44b and 44c. The connection between the lowest modular component 25 and tower support 18 is similar to the connection of modular component 25 with any other modular component 25.

As can be seen in FIG. 6, each of the legs has a vertical height 46 which determines the spacing between adjacent plates 27. The dimensions of plate 27 and the length of dimension 46 may be varied to provide slots 12 of various dimensions to accommodate different types of cases. For example, FIG. 5 shows plate 27 dimensioned to accommodate CD case 14. Height 46, shown in FIG. 6, is slightly longer than the height of CD case 14. With the same dimensions on plate 27, height 46 may be doubled to accommodate double CD cases. Modular components having the same dimensions of plate 27 with different heights 46 can be interchangeably stacked within a single tower. For example, several double height slots may be provided at the bottom of the tower, with the remainder consisting of single height slots. In this manner, a single tower can accommodate both single and double CD cases. The dimensions of plate 27 and height 46 may be further modified to accommodate audio/video cassette cases, computer storage media cases or any other suitable item. Towers with variously sized slots may be pre-assembled and then attached to a tower support 18. As can be seen in FIGS. 5 and 6, the bottom edge of legs 35*a*, 35*b* and 35*c* has a slight recess where it meets the adjacent lower modular component 25. This recess, which extends at the predetermined oblique angle, provides a contoured design along the height of the three columns of each tower.

While only several embodiments of the present invention have been shown and described, it is to be understood that many changes and modifications may be made thereunto without departing from the spirit and scope of the invention as defined in the appended claims.

What is claimed is:

1. A device for storing compact disc cases, audio/video cassette cases, computer storage media or the like in a vertical stack with one side of the cases extending outwardly from the device and angled upwardly for easy viewing, the device comprising:

a base having a raised front portion and a top surface set at an oblique angle; and a plurality of modular components stacked on top of said base, each modular component having a central plate with a periphery disposed parallel to said top surface; and vertically-extending support means comprising legs formed at said periphery of each modular component for engaging an adjacent modular component and forming a storage slot, with an open receiving end, between each adjacent pair of central plates for storing the cases at said oblique angle, said legs and portions of said plate periphery remote from the storage slot forming a continuous column along a height of said stacked modular components with said legs bordering the storage slot.

2. The device according to claim 1, wherein said central plate is triangular with three corners, three sides and a leg formed at each corner, each of said legs has a flat interior surface facing the storage slot and a shaped exterior surface.

3. The device according to claim 2, wherein said three corners comprise two front corners and a rear corner, said three sides comprise two rear sides extending between said front corners and said rear corner and a front side extending between said front corners, and said two front corners and said front side are disposed above said raised front portion of said base.

4. The device according to claim 3, wherein two of said flat interior surfaces at said two front corners face each other across said front side, said two front corners and said front side are adjacent the open receiving end of the storage slot; and the flat interior surface at said rear corner is positioned opposite the open receiving end.

5. The device according to claim 4, wherein said two rear sides taper toward each other as they extend from said two front corners back toward said rear corner so that the rear corners of a stored case extend outwardly from the device.

6. The device according to claim 5, wherein the case contacts the leg at said rear corner when fully inserted with one side of the case remaining free outside the open receiving end of the storage slot for easy viewing and removal of the case from the device.

7. The device according to claim 6, wherein said legs are connected to said plate of an adjacent modular component.

8. The device according to claim 7, wherein said modular components are integrally formed with said legs integrally molded to said central plate.

9. The device according to claim 8, wherein said central plate includes a first side having said legs extending outwardly therefrom and a second opposite side including connection means for connecting to the legs of an adjacent modular component.

10. The device according to claim 9, wherein said connection means comprises a recess at each corner wherein said legs include pegs positioned and dimensioned to fit within the recesses on an adjacent modular component.

11. The device according to claim 10, wherein the length of said legs determines the height of the storage slot and is variable to provide storage slots for differently shaped cases.

12. The device according to claim 11, wherein said base includes two raised front portions and two top surfaces set at said oblique angle for supporting two stacks of modular components.

13. The device according to claim 12, wherein said base supports four stacks of modular components with each stack being oriented 90° from the two adjacent stacks.

* * * * *